United States Patent [19]

Citta et al.

[11] Patent Number: 4,586,078

[45] Date of Patent: Apr. 29, 1986

[54] CATV UPSTREAM SIGNAL TRANSMISSION AT NONHARMONIC VIDEO FREQUENCIES

[75] Inventors: Richard W. Citta, Oak Park; Gary J. Sgrignoli; Dennis M. Mutzabaugh, both of Mt. Prospect, all of Ill.

[73] Assignee: Zenith Electronics Corporation, Glenview, Ill.

[21] Appl. No.: 560,061

[22] Filed: Dec. 9, 1983

[51] Int. Cl.[4] .......................... H04N 7/10; H04N 7/14
[52] U.S. Cl. ........................................ 358/86; 455/5
[58] Field of Search ................ 358/84, 86; 455/2, 4, 455/5; 320/73; 340/536

[56] References Cited

U.S. PATENT DOCUMENTS

| | | | |
|---|---|---|---|
| 3,752,908 | 8/1973 | Boenke et al. | 455/5 X |
| 3,803,491 | 4/1974 | Osborn | 455/5 |
| 3,806,814 | 4/1974 | Forbes | 455/5 X |
| 3,859,596 | 1/1975 | Jannery et al. | 455/5 |
| 3,898,566 | 8/1975 | Switzer et al. | 455/4 |
| 3,943,447 | 3/1976 | Shomo, III | 455/5 X |
| 4,002,843 | 1/1977 | Rackman | 455/5 X |
| 4,118,669 | 10/1978 | Fung | 455/5 X |
| 4,148,021 | 4/1979 | Watanabe | 455/5 X |
| 4,413,229 | 11/1983 | Grant | 455/5 X |
| 4,509,073 | 4/1985 | Baran et al. | 358/86 |
| 4,520,508 | 5/1985 | Reichert, Jr. | 358/86 X |

FOREIGN PATENT DOCUMENTS

| | | | |
|---|---|---|---|
| 103438 | 3/1984 | European Pat. Off. | 358/86 |
| 140475 | 5/1985 | European Pat. Off. | 358/86 |

*Primary Examiner*—Keith E. George

[57] ABSTRACT

In a cable television (CATV) system improved upstream data communication is provided by the use of preferred frequencies. Harmonics of downstream video and audio carrier signals arising from cable discontinuities produce common mode nonlinear distortion. Cable discontinuities caused by a loose, defective or corroded connector operate as a downstream mixing diode. The cross- and intermodulation products thus produced are avoided in the present invention by the use of upstream frequencies displaced from these harmonics. In a preferred embodiment, two harmonically-related upstream carriers generated by a single signal source and centered between adjacent harmonic noise peaks provide reliable upstream data channels in a two-way CATV system. In another arrangement, each subscriber terminal transmits upstream in an alternating manner, first at one frequency and then at a second frequency, until an acknowledge signal is received from the CATV headend.

1 Claim, 2 Drawing Figures

CATV UPSTREAM SIGNAL TRANSMISSION AT NONHARMONIC VIDEO FREQUENCIES

BACKGROUND OF THE INVENTION

This invention relates generally to CATV systems and is more specifically directed to the upstream transmission of data in a two-way CATV system.

Cable television systems typically include a central master source of television programming information, or headend, which imparts programs at different assigned frequencies to a network of cable connections. The network, or cable plant, includes a main distribution cable to which is coupled a plurality of "drop" cables, each of which is coupled to an individual subscriber terminal. Particularly in large metropolitan areas, CATV systems may include one or more master sources which are patched into a common distribution system. CATV signals are broadcast from the headend to individual subscribers in a "downstream" direction over different assigned carrier frequencies typically from 50 to 450 MHz. These downstream signals are in conventional television video signal format and include synchronization, audio, video, etc., components. These downstream signals are transmitted in a branched-out arrangement where all headend initiated signals are provided to all remote subscribers, if authorized.

In a two-way CATV system each subscriber is able to transmit signals back to the CATV headend. These subscriber-initiated signals may include program purchasing requests, opinion poll responses and CATV converter status information. These upstream signals typically make use of out of band frequencies such as in the 5–32.5 MHz band. The upstream signal distribution network is in the form of a "merging tree topology" in which the signals generated by many sources, or subscribers, converge and are transmitted on a single transmission line back to the CATV headend.

In an effort to increase the number of CATV channels available, several types of coherent headends have been devised. One coherent headend is termed Harmonically Related Coherent (HRC), while another is termed Interval Related Coherent (IRC). The HRC headend requires all cable channel picture carriers to be shifted to harmonics of a 6 MHz reference signal. IRC headend channels operate in normally assigned frequencies, except channels 5 and 6, which must be shifted 2 MHz to fall in line with the other channels. In yet another arrangement all cable channel picture carriers are spaced 6 MHz apart from an adjacent channel with the exception of channels 5 and 6. Channels 4 and 5 are separated by less than 6 MHz, while channels 6 and 7 are spaced greater than 6 MHz apart. In all of the aforementioned CATV signal distribution arrangements, essentially all CATV downstream signals are harmonically related.

In general, the main distribution cable is well maintained in a CATV system. However, the connectors coupling either the drop cable to the distribution cable or coupling a subscriber terminal to a drop cable are frequently subject to wear and corrosion. A defective connector produces nonlinearities in the signal handling characteristics of the cable. Under such conditions, a faulty connector operates as a mixing diode in generating sum and difference products of all CATV downstream signals. Only those subscribers having a faulty connector will experience the aforementioned video signal distortion due to the thus generated cross- and intermodulation products. However, these unwanted harmonics are coupled upstream to the CATV headend and in a two-way CATV system seriously degrade upstream communication. Because of the various components of the video signal and side bands associated therewith, the number of modulation products thus produced is very large and substantially contributes to the noise figure across the entire video band. In addition, because television signals employ only downward modulation from a clamped synchronization signal, the effective carrier level of each channel varies according to the video content of the signal. Thus, the various modulation products are a function of video signal content as well as carrier and subcarrier signal frequencies and, as such, present a continually varying source of noise which is extremely difficult to eliminate, or even minimize.

An example of a two-way CATV system utilizing selected frequencies for upstream and downstream communication is disclosed in U.S. Pat. No. 3,943,447 to Shomo. The system described therein takes advantage of a transparent window, in both the upstream and downstream directions, to communications signals over a frequency band from 10–300 KHz wherein the communications signals follow the path of a 60 Hz power signal throughout the system. It is claimed that these communications signals do not interfere with the high frequency television signals being transmitted, nor are they subject to interference by such television signals. This system permits bi-directional communication between any two or more points linked by such a CATV system. The low frequencies of the signals utilized in this system limit its data handling capacity and thus the amount of information which can be transmitted.

The present invention is intended to overcome the limitations of the prior art and solve the aforementioned problems by providing a system which makes use of nonharmonic frequencies for upstream signal transmission in a two-way CATV system.

OBJECTS OF THE INVENTION

Accordingly, it is an object of the present invention to provide improved upstream data transmission in a two-way CATV system.

It is another object of the present invention to reduce the effects of common mode distortion arising from the mixing of harmonically related downstream carrier signals in a two-way CATV system.

Still another object of the present invention is to reduce the effects of nonlinear downstream cable transmission characteristics on upstream data transmission in a two-way CATV system.

A further object of the present invention is to utilize a single signal source for generating upstream carrier signals at several predetermined frequencies in a two-way CATV system.

It is yet another object of the present invention to improve upstream communication in a two-way CATV system by alternating between two carrier signal frequencies in order to minimize the effects of signal interference.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
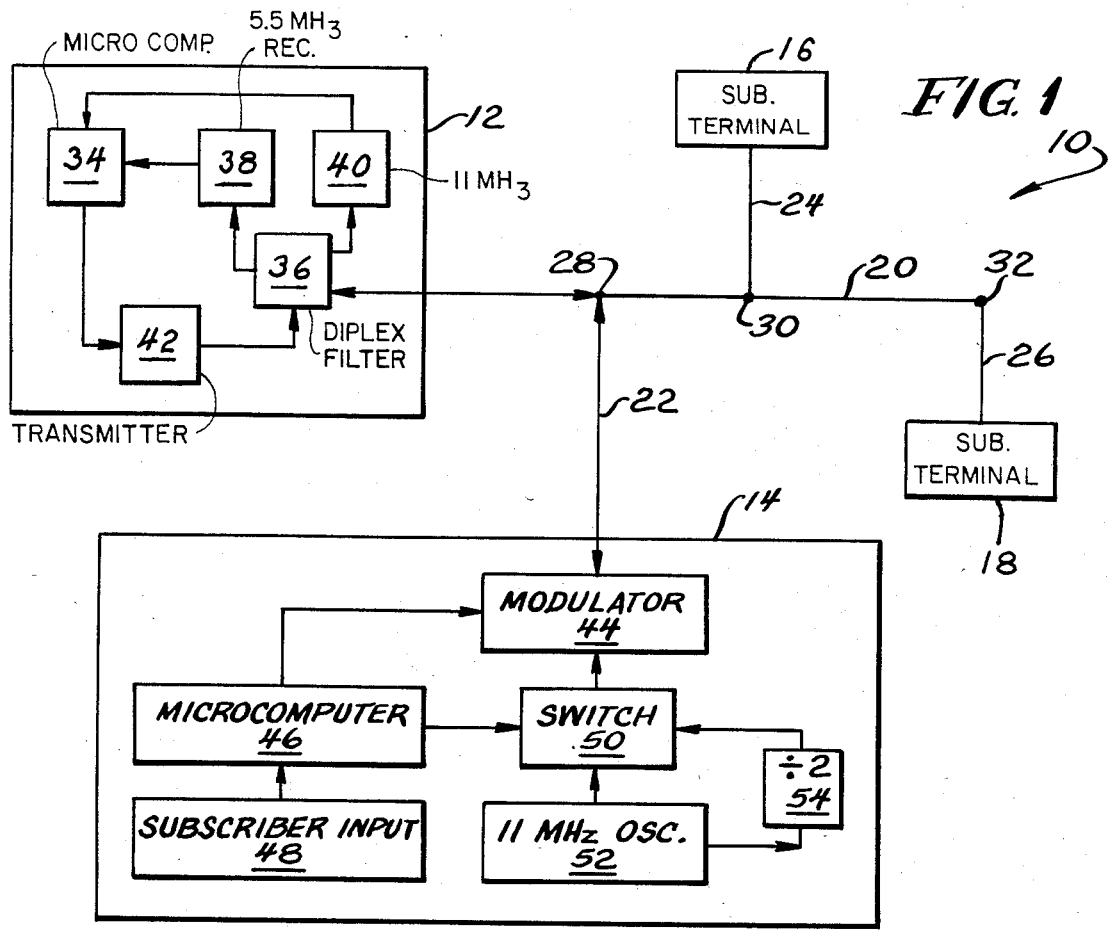
FIG. 1 is a simplified block diagram of a two-way CATV system embodying the principles of the present invention.

Referring to FIG. 1, there is shown in simplified block diagram form a two-way cable television (CATV) system 10 for transmitting upstream signals at uniquely determined frequencies in accordance with the present invention.

The CATV system 10 includes a head end portion 12 from which control and programming signals are provided to a plurality of CATV subscriber terminals 14, 16 and 18. Although FIG. 1 shows only three subscriber terminals included in the CATV system 10, it is to be understood that the present invention contemplates the distribution of the cable television signals to a large number of subscriber terminals, each having associated therewith a respective cable television service controller and television receiver which is not shown in FIG. 1 as it does not form a part of the present invention.

The CATV system 10 includes a distribution cable 20 and a plurality of drop cables 22, 24 and 26. Typically, each subscriber terminal is coupled to the distribution cable 20 via a respective drop cable. The CATV headend 12 includes a 5.5 MHz receiver 38 and a 11.0 MHz receiver 40 coupled to the distribution cable 20 via a diplex filter 36. Therefore, a 5.5 MHz upstream signal is provided to receiver 38 via diplex filter 36, while an 11.0 MHz upstream signal is provided to receiver 40 via diplex filter 36. The 5.5 and 11.0 MHz receivers 38, 40 are each coupled to a microcomputer 34 in headend 12. Microcomputer 34 is responsive to the upstream signals provided to respective receivers 38, 40 and performs various functions in response thereto. For example, microcomputer 34 may implement a subscriber authorization operation following a subscriber-initiated request for CATV programming. On the other hand, the primary function of the CATV headend 12 with respect to the upstream data may be merely to store this information for later use such as in the case of subscriber polling responses or CATV converter status information, e.g., power, program viewed, etc. Microcomputer 34 is further coupled to a transmitter 42 which, in turn, is coupled by means of diplex filter 36 to the distribution cable 20. Therefore, microcomputer-generated control data for controlling each of the subscriber terminals 14, 16 and 18 may be provided to the distribution cable 20 via diplex filter 36 and transmitter 42. The downstream data provided by transmitter 42 to each of the subscriber terminals may further include subscriber address and program authorization data as well as CATV video program signals. CATV headend 12 may include additional components such as an encoder/decoder, disc drives and a tape backup. These elements of the CATV headend 12 are not shown in FIG. 1 as they do not form a part of the present invention.

For simplicity, only the details of CATV subscriber terminal 14 are discussed herein since the remaining subscriber terminals 16 and 18 are similarly configured for performing similar functions. Only the signal generation portion of CATV subscriber terminal 14 is discussed in detail herein, since the manner in which a subscriber terminal receives and responds to CATV headend-initiated downstream data is not a part of the present invention. Subscriber terminal 14 includes a subscriber input device 48, such as a keyboard, by means of which a viewer may enter data. This data may typically be in the form of a program request or headend-requested subscriber polling information. Subscriber input device 48 is coupled to a microcomputer 46 which may either generate data in response to inputs from the subscriber input device 48, or may generate upstream data in response to downstream headend-initiated requests. Two outputs are generated by microcomputer 46: one is a data output provided to modulator 44, the other is a control output provided to switch 50. The data output represents information to be communicated to CATV headend 12, while the control output controls the operation of switch 50. Switch 50 may take on any of a larger number of switching device configurations and may generally be termed an electronic switch. Two additional inputs are provided to switch 50. One input is from an 11 MHz oscillator 52, while the other input is from a divide-by-two circuit 54 which, in turn, is also coupled to the 11 MHz oscillator. The output of the divide-by-two circuit 54 to switch 50 is a 5.5 MHz signal. Switch 50, in response to the control input from microcomputer 46, provides either an 11 MHz or a 5.5 MHz signal to modulator 44. In one embodiment of the present invention, the 5.5 and 11 MHz signals are alternately provided by switch 50 to modulator 44. Modulator 44 is also coupled to microcomputer 46 and is controlled by the data output therefrom. Therefore, the 5.5 and 11 MHz output signals from switch 50 are alternately modulated by modulator 44 in accordance with data from microcomputer 46 for transmission via drop cable 22 to CATV headend 12. By alternately transmitting upstream at two different frequencies, upstream data transmission reliability is increased while the effects of interference on upstream signal transmissions are reduced. Each CATV subscriber terminal will continue to transmit upstream until its upstream data signal is successfully communicated to CATV headend 12 and an acknowledge signal is received from the transmitter 42 of CATV headend 12. One example of the manner in which such a CATV subscriber terminal control signal is generated and provided thereto is described in copending patent application "Two-Way CATV System With AML Commands", filed in the name of Richard W. Citta, and assigned to the assignee of the present application.

Downstream signals from the cable headend 12 to individual subscribers typically include subscriber address and program authorization information which are transmitted on frequencies between 50 and 450 MHz in a preferred embodiment. Upstream data from each subscriber terminal to the CATV head end 12 is preferably transmitted within a frequency band of 5–32.5 MHz. Data transmitted upstream to the CATV headend 12 may include such information as subscriber responses to headend initiated polling signals, subscriber terminal power status information, and subscriber-initiated program requests. The 17.5 MHz between the upstream and downstream signal frequencies represents a guard band for providing frequency isolation between these two groups of CATV signals.

However, complete isolation between the upstream and downstream channels is not available in a typical CATV system. For example, the drop cable connectors 28, 30 and 32 may become damaged, corroded, or subject to a physical strain so as to impair the electrical connection resulting in degraded connector performance. Typically, under any of the aforementioned situations, the drop connector will function electrically as a mixing diode in adding and subtracting all of the downstream CATV video carriers and sidebands associated therewith. With in excess of 50 channels available in some CATV systems and each channel having associated therewith several carrier frequencies, a large number of cross- and intermodulation products will be formed by a malfunctioning or defective drop connector. These unwanted products appear as noise in the downstream video signals and degrade the video signal provided to the subscriber terminal coupled to the drop cable via the malfunctioning or damaged drop connector. Thus, a defective drop connector affects only the quality of the downstream video signal provided to its associated subscriber terminal. However, the effect of a defective drop connector is substantially different with respect to upstream transmitted signals.

The inter- and crossmodulation products generated by the defective drop connector are not only transmitted downstream, but are also coupled upstream to the CATV headend 12. Thus, a single defective drop connector in the two-way CATV system 10 will degrade the upstream data channel for all subscriber terminals by providing various CATV signal modulation products to the CATV headend 12.

Figure 2:
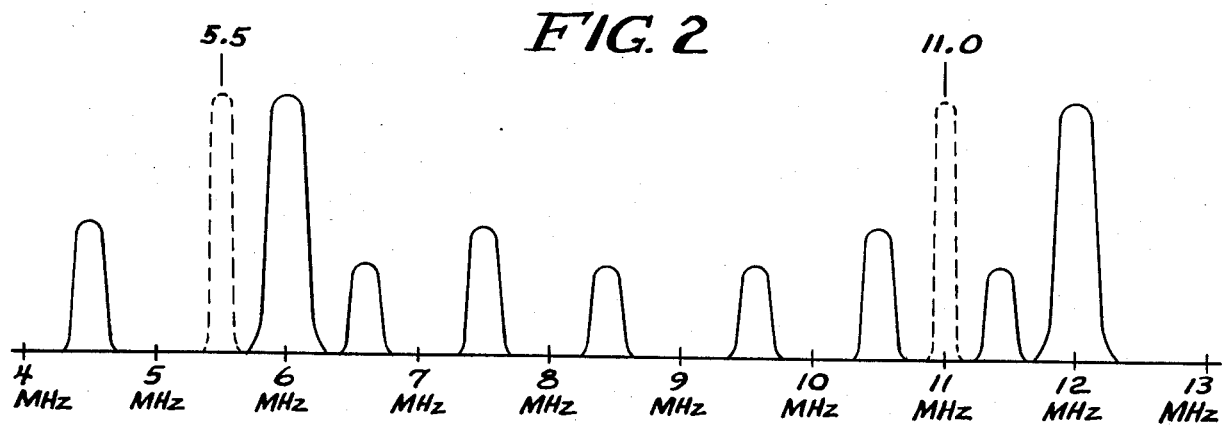
FIG. 2 illustrates various modulation products resulting from video and audio carrier and sub-carrier downstream frequencies in a CATV system as well as the frequencies of signals used for upstream transmissions in the CATV system in accordance with the present invention.

Referring to FIG. 2, there is shown the frequencies of various interfering modulation products generated by a defective drop connector which are reflected upstream to the CATV headend 12. Because the downstream video carrier signals are 6 MHz apart over the band of 50–450 MHz, the interfering signal spectrum shown in FIG. 2 is repeated each 6 MHz increment over the upstream frequency band. Because this interference spectrum repeats itself every 6 MHz, only the presence of interfering signals in the band from approximately 6–12 MHz will be considered herein, with the understanding that a similar interference spectrum and the following discussion applies over the entire upstream frequency band of 5–32.5 MHz.

As shown in FIG. 2, strong modulation products resulting from downstream video carrier signals are present at 6 and 12 MHz. Each downstream CATV channel has an audio carrier associated therewith displaced 4.5 MHz above its video carrier. The modulation product at 10.5 MHz, as well as the modulation product at 4.5 MHz, thus results from intermodulation of such downstream audio and video carriers. Finally, a modulation product is shown at 7.5 MHz which represents cross-modulation of audio and adjacent channel video downstream carrier signals. The frequency distribution of the various signals shown in FIG. 2 falls off exponentially due to the various sideband frequencies displaced ±15 KHz, ±30 KHz, etc., from the respective downstream carrier frequencies. The modulation products discussed thus far represent the primary upstream interfering signals in a two-way CATV system. In addition, various secondary interfering signals are seen by the CATV headend. These secondary interfering signals arise primarily from cross and intermodulation of the chroma, or color, components of the downstream video carrier signals and are shown in FIG. 2 at frequencies of 9.58 MHz, or 3.58 MHz above the 6 MHz modulation product, and 8.42 MHz, or 3.58 MHz below the 12.0 MHz modulation product. Additional secondary sources of interference occur at 6.58 MHz resulting from modulation products of downstream audio and chroma carriers. Similarly, a secondary source of interference occurs at 11.4 MHz also resulting from modulation products of downstream audio and chroma carriers. Thus, it can be seen from FIG. 2 that various sources of interference occur between the video carriers induced modulation products in a two-way CATV system having a downstream signal transmission discontinuity.

The present invention improves upstream data communication in a two-way CATV system by minimizing the effects of the aforementioned primary and secondary sources of interference. This is accomplished by determining the optimum frequencies for upstream signal transmission in view of the various aforementioned sources of interference encountered in a two-way CATV system. Application of the present invention can be seen from FIG. 2 wherein are shown in dotted line form the upstream signal frequencies utilized in a preferred embodiment. From FIG. 2, it can be seen that at 5.5 and 11.0 MHz the absence of either primary or secondary interfering signals permits the upstream signals to be transmitted free of unwanted interference. In addition, by utilizing two harmonically related frequencies, a single frequency source such as a conventional oscillator circuit 52 in combination with a frequency divider 54 which may be selectively engaged for generating both upstream signal frequencies. Finally, switch 50 under the control of microcomputer 46 permits alternate upstream signal transmission at 5.5 and 11.0 MHz in order to provide a second backup channel for more reliable upstream data communication. Thus, the use of the present invention in a two-way CATV system not only substantially improves upstream communication performance but also simplifies and reduces the cost of each individual subscriber terminal. There has thus been shown an improved arrangement for upstream signal transmission in a two-way CATV system. Upstream carrier frequencies are utilized for the transmission of upstream signals for minimizing the effects of cross- and intermodulation products of the downstream video and audio carrier signals which are coupled upstream by discontinuities in the cable of the two-way CATV system. While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a two-way CATV system wherein a plurality of modulated signals each corresponding to a CATV channel and having associated therewith a plurality of carrier frequencies are transmitted downstream in a band between 50–450 MHz on a cable from a headend to a plurality of subscriber terminals at spaced frequency intervals of 6 MHz and wherein modulation products of said downstream modulated signals arising from discontinuities in said cable are coupled upstream to said headend, the improvement wherein each of said subscriber terminals comprises:

means for generating a data signal and a carrier select signal, the carrier select signal being generated independently of the headend;

means for generating a 5.5 MHz carrier signal and an 11 MHz carrier signal;

switch means coupled to said carrier signal generating means, said switch means having an output terminal and being responsive to said carrier select signal for alternately developing said 5.5 MHz and 11 MHz carrier signals at said output terminal;

means coupled to said output terminal for transmitting the data signal upstream to the headend as modulation of said alternately developed 5.5 MHz and 11 MHz carrier signals; and means at the headend for receiving the transmitted upstream data signals.

* * * * *